United States Patent
Yoshida (10) Patent No.: US 8,536,965 B2
(45) Date of Patent: Sep. 17, 2013

(54) ANALOG POINTING KEY STRUCTURE (75) Inventor: Takaya Yoshida, Kodama-gun (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/498,866

(22) PCT Filed: Aug. 30, 2010

(86) PCT No.: PCT/JP2010/064704
§ 371 (c)(1),
(2), (4) Date: Mar. 28, 2012

(87) PCT Pub. No.: WO2011/040162
PCT Pub. Date: Apr. 7, 2011

(65) Prior Publication Data
US 2012/0182101 A1    Jul. 19, 2012

(30) Foreign Application Priority Data

Sep. 30, 2009  (JP) ................. 2009-226051

(51) Int. Cl.
*H01H 9/00*    (2006.01)
(52) U.S. Cl.
USPC .......................................... 335/205; 335/207
(58) Field of Classification Search
USPC ....................................................... 335/205
See application file for complete search history.

(56) References Cited

U.S. PATENT DOCUMENTS

| | | | |
|---|---|---|---|
| 5,867,082 A * | 2/1999 | Van Zeeland | 335/205 |
| 6,864,679 B2 * | 3/2005 | Yokoji et al. | 324/207.11 |
| 7,126,072 B2 * | 10/2006 | Saitoh | 200/512 |
| 7,262,374 B2 * | 8/2007 | Takatsuka et al. | 200/5 A |
| 7,417,422 B2 * | 8/2008 | Kang | 324/207.25 |
| 7,462,787 B1 * | 12/2008 | Kang et al. | 200/4 |
| 7,489,296 B2 * | 2/2009 | Nishino et al. | 345/157 |
| 2002/0061735 A1 * | 5/2002 | Wingett et al. | 455/90 |
| 2004/0119687 A1 * | 6/2004 | Suzuki et al. | 345/156 |
| 2005/0059858 A1 * | 3/2005 | Frith et al. | 600/118 |
| 2005/0264530 A1 * | 12/2005 | Takatsuka et al. | 345/160 |

FOREIGN PATENT DOCUMENTS

| | | |
|---|---|---|
| JP | 2005-347042 A | 12/2005 |
| JP | 2006-201886 A | 8/2006 |
| JP | 2007-012591 A | 1/2007 |
| JP | 2008-153233 A | 7/2008 |

* cited by examiner

*Primary Examiner* — Elvin G Enad
*Assistant Examiner* — Lisa Homza
(74) *Attorney, Agent, or Firm* — Sughrue Mion, PLLC (57) ABSTRACT

An analog pointing key structure includes a rigid body key top; a surrounding member having a hole for exposing the key top; a support member, to which the key top is fixed, having an elastic returning part that permits the key top to move in a direction along a surface thereof and to cancel the movement; a ring-form magnetic member fixed to the support member on a back surface of the surrounding member so as to be interposed between the key top and the returning part; a magnetic sensor that measures a change in magnetic flux density due to displacement of the magnetic member which moves together with the key top; a ring-form screen plate provided on a surface of the magnetic member so that an inner-peripheral part of the plate is positioned within the above hole; a key top support plate, to which the key top is attached, an outer-peripheral part of the support plate being positioned on a back surface of the screen plate, and the support plate having an outer diameter larger than an inner diameter of the screen plate, and; an elastic member, fixed to a back surface of the support member, permitting the key top to move in a thickness direction of the support member and to cancel the movement.

6 Claims, 5 Drawing Sheets

ANALOG POINTING KEY STRUCTURE

TECHNICAL FIELD

The present invention relates to an analog pointing key structure which is preferably applied to a cellular phone terminal, a PDA, or an operating device (e.g. game controller) for an electronic device.

Priority is claimed on Japanese Patent Application No. 2009-226051, filed Sep. 30, 2009, the contents of which are incorporated herein by reference.

BACKGROUND ART

In recent years, cellular phone terminals or portable music players have functions (such as WEB browsing) equal to that of personal computers, and accordingly it is required to provide, not only ordinary directional keys, but also a pointing device (similar to a mouse of a personal computer) in which the pointer (mark) continuously moves on a display screen in an analog manner.

As such a device, an analog pointing key structure is known, which has:
(i) a rigid body key top;
(ii) a support member, on a surface of which, the rigid body key top is fixedly attached, where an elastic returning part is provided so as to surround the rigid body key top, and the elastic returning part permits the rigid body key top to be displaced along the above surface and can return the displaced rigid body key top to the original position;
(iii) a ring-form magnetic member which is fastened to the support member so as to surround the rigid body key top, and is interposed between the rigid body key top and the elastic returning part; and
(iv) a magnetic sensor that senses a change in the magnetic flux density due to a displacement of the ring-form magnetic member which operates together with the rigid body key top.

For example, Patent Document 1 discloses an analog pointing key structure which has:
(i) a key top;
(ii) a support member, on a front surface (as an operation surface) of which, the key top is fixedly attached, where a pusher for pushing a contact input part of a substrate is provided on a back surface which faces the substrate;
(iii) a magnet fastened to the support member at a side position from the pusher when it is assumed that the pusher is positioned at the center;
(iv) a magnetic sensor that senses a change in the magnetic flux density due to comovement of the magnet which follows a side shift of the key top; and
(v) an elastic flexible part provided between the magnet and the pusher, so as to permit a displacement (in a pushing direction) of the key top caused by the pushing operation using the key top.

PRIOR ART DOCUMENT

Patent Document
Patent Document 1: Japanese Unexamined Patent Application, First Publication No. 2007-12591.

DISCLOSURE OF INVENTION

Problem to be Solved by the Invention

In the analog pointing key structure disclosed in the above-described Patent Document 1, the key top is adhered to a base sheet made by a rubber-like elastic solid, by using an adhesive. Therefore, if a user roughly operates the key top so as to perform a side shift thereof in a direction perpendicular to the pushing direction of the key top, the key top may be detached from the base sheet, which damages the durability of the relevant product.

In addition, the operation of the key top is defined only by the support member. Therefore, when performing the pushing operation of the key top, the displacement thereof in the pushing direction may not be immediately returned, or the responsibility of the magnet which operates together with the key top may be degraded. Accordingly, such an analog pointing key structure having a low-level operability is insufficient for practical use.

In light of the above circumstances, an object of the present invention is to provide an analog pointing key structure which has desired durability and operability, is sufficient for practical use.

Means for Solving the Problem

In order to solve the above problems, the present invention provides an analog pointing key structure comprising:
a first rigid body key top;
a surrounding member that is provided so as to surround the first rigid body key top, and has a hole through which the first rigid body key top is exposed;
a support member, on a front surface of which the first rigid body key top is fixed, wherein the support member has an elastic returning part provided in at least a part of an area which surrounding the first rigid body key top, and the elastic returning part permits the first rigid body key top to move in a direction along a surface of the first rigid body key top, and can cancel the movement;
a ring-form magnetic member provided on a back-surface side of the surrounding member so as to be fixed to the support member and to surround the first rigid body key top in a manner such that at least a part of the ring-form magnetic member is interposed between the first rigid body key top and the elastic returning part;
a magnetic sensor that measures a change in a magnetic flux density due to a displacement of the ring-form magnetic member which moves together with the first rigid body key top;
a screen plate which has a ring form and is provided on a surface of the ring-form magnetic member in a manner such that an inner-peripheral part of the screen plate is positioned within the hole of the surrounding member;
a key top support plate, on a surface of which the first rigid body key top is attached, wherein an outer-peripheral part of the key top support plate is positioned on a back-surface side of the screen plate, and the key top support plate has an outer diameter larger than an inner diameter of the screen plate, and;
an elastic member fixed to a back surface of the support member, where the elastic member permits the first rigid body key top to move in a thickness direction of the support member, and can cancel the movement.

Effect of the Invention

In accordance with the present invention, the key top support plate, to which the first rigid body key top is attached, has an outer diameter larger than an inner diameter of the screen plate which has a ring form and is provided on a surface of the ring-form magnetic member. Therefore, the key top support plate can prevent the first rigid body key top from falling through a hole of the screen plate, thereby preventing the first rigid body key top from being detached and improving the durability of a product which employs the analog pointing key structure of the present invention.

Also, in accordance with the present invention, since part of the operation of the rigid body key top can be defined, not only by the support member, but also by the elastic member. Therefore, it is possible, for example, to immediately cancel the displacement caused by pushing the rigid body key top, and to define a positional relationship between the rigid body key top and the ring-form magnetic member. Accordingly, it is possible to provide an analog pointing key structure having preferable operability and sufficient functionability for practical use.

MODE FOR CARRYING OUT THE INVENTION

Figure 1:
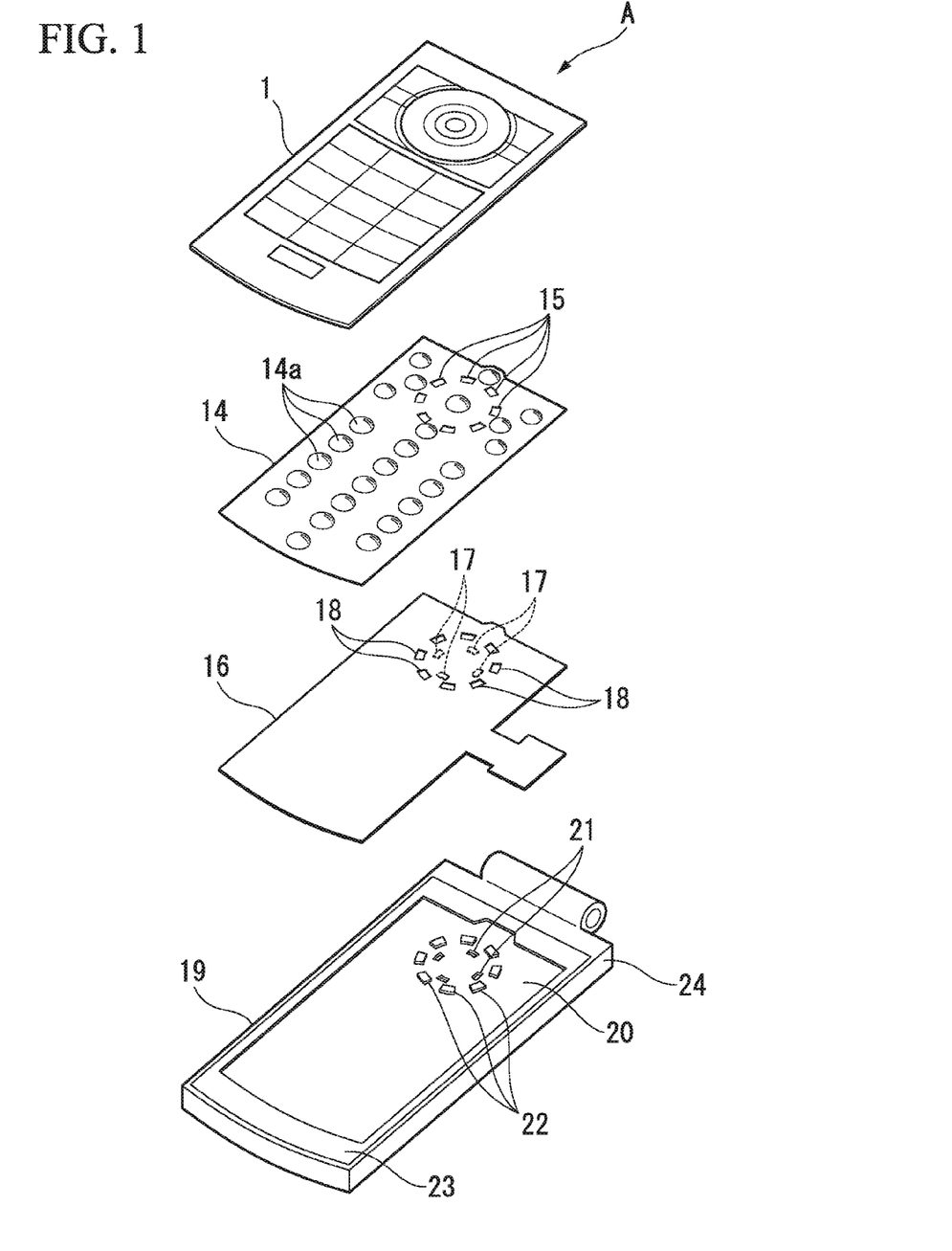
FIG. 1 is an exploded perspective view showing an analog pointing key structure A as an embodiment of the present invention.

FIG. 1 is an exploded perspective view showing an analog pointing key structure A as an embodiment of the present invention.

As shown in FIG. 1, the analog pointing key structure A has a key sheet 1, a metal dome sheet 14, and a flexible substrate 16, which each have a sheet form and are stacked on each other. The stacked body is installed in a front case 24, so that the general structure is formed. The front case 24 is made by integrally forming an insert metal plate 19 and a resin.

Figure 2:
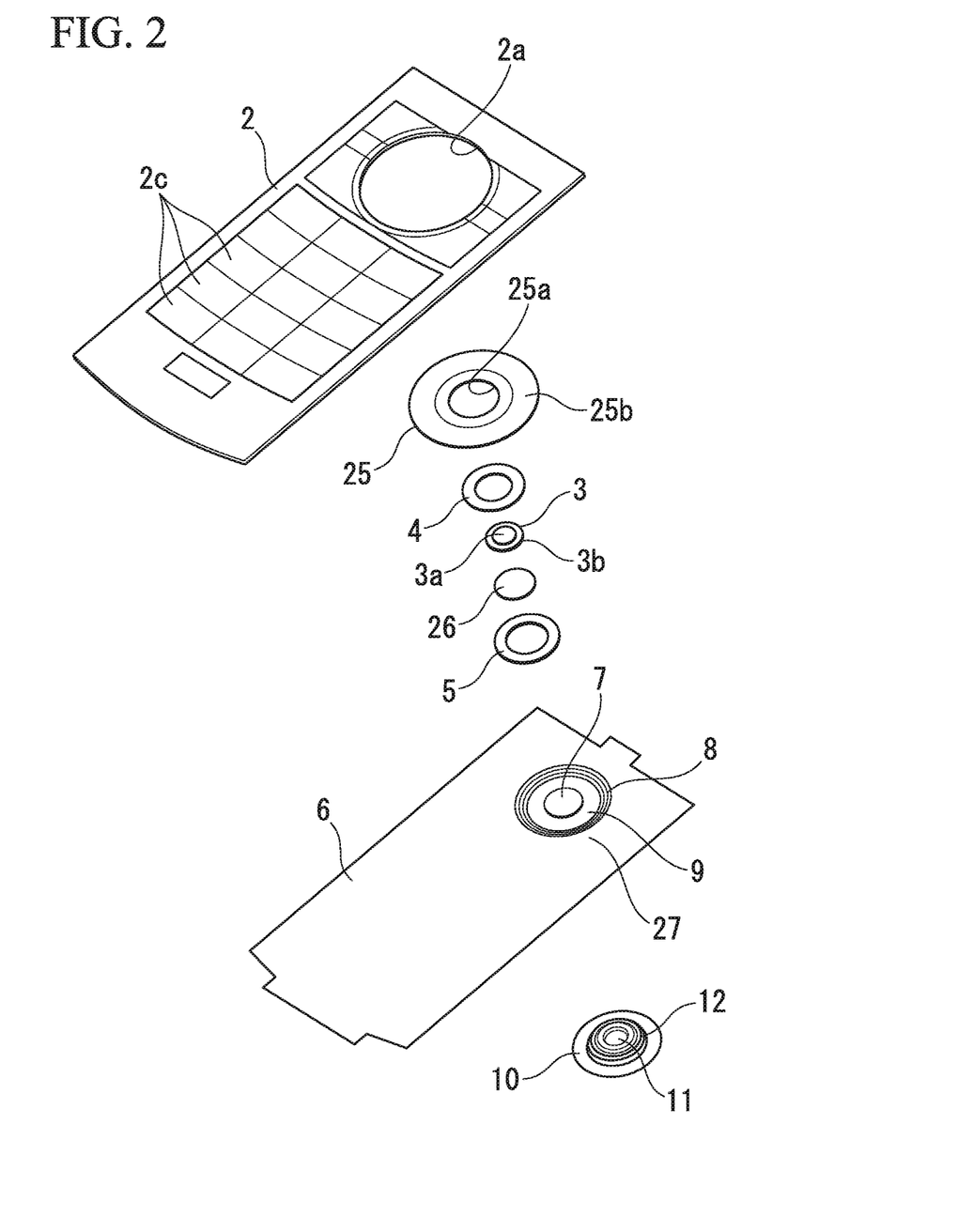
FIG. 2 is an exploded perspective view showing the key sheet 1 in the embodiment of the present invention.
Figure 3:
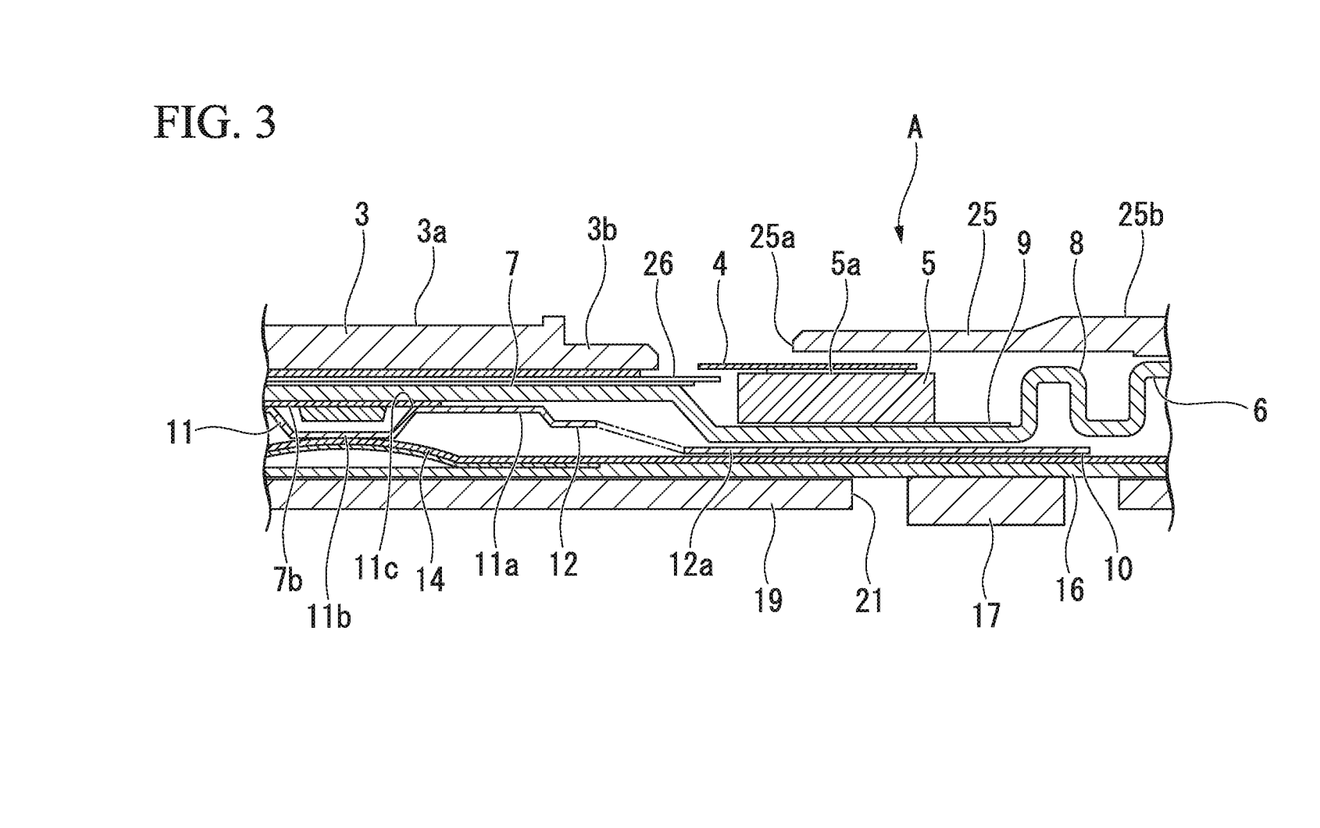
FIG. 3 is a partially sectional view showing the key sheet 1 in the embodiment of the present invention.

FIG. 2 is an exploded perspective view showing the key sheet 1, and FIG. 3 is a partially sectional view showing the analog pointing key structure A.

As shown in FIG. 2, the key sheet 1 has a key unit 2, a directional key 25, a screen plate 4, a decision key top 3, a detachment preventing plate 26, a ring-form magnetic member 5, a key rubber 6, and a stopper plate 10.

The key unit 2 is a sheet-form member in which a circular hole 2a and buttons 2c are formed. The decision key top 3 and the directional key 25 are exposed through the circular hole 2a. The buttons 2c are elastically deformable so that they can be pushed and returned in the thickness direction of the key unit 2

As shown in FIGS. 2 and 3, the decision key top 3 is a substantial disk-form member made of a rigid resin. The decision key top 3 has (i) a protruding top part 3a, with which a finger of the operator or the like contacts, and which directly receives the operation of the operator, and (ii) a flange part 3b formed in an outer-peripheral area of the top part 3a. The back surface of the decision key top 3 is adhered to the detachment preventing plate 26 via an adhesive or the like.

The detachment preventing plate 26 is a substantial disk-form member made of a rigid resin or the like, and has an outer diameter larger than that of the decision key top 3.

The directional key 25 is a substantial ring-form member made using a thin metal plate having a high rigidity, and has an outer diameter larger than that of the circular hole 2a of the key unit 2. In addition, the directional key 25 also has a hole 25a having an inner diameter larger than the outer diameter of the flange part 3b of the decision key top 3. The decision key top 3 is arranged in a manner such that the top part 3a is exposed through the hole 25a of the directional key 25.

Figure 4:
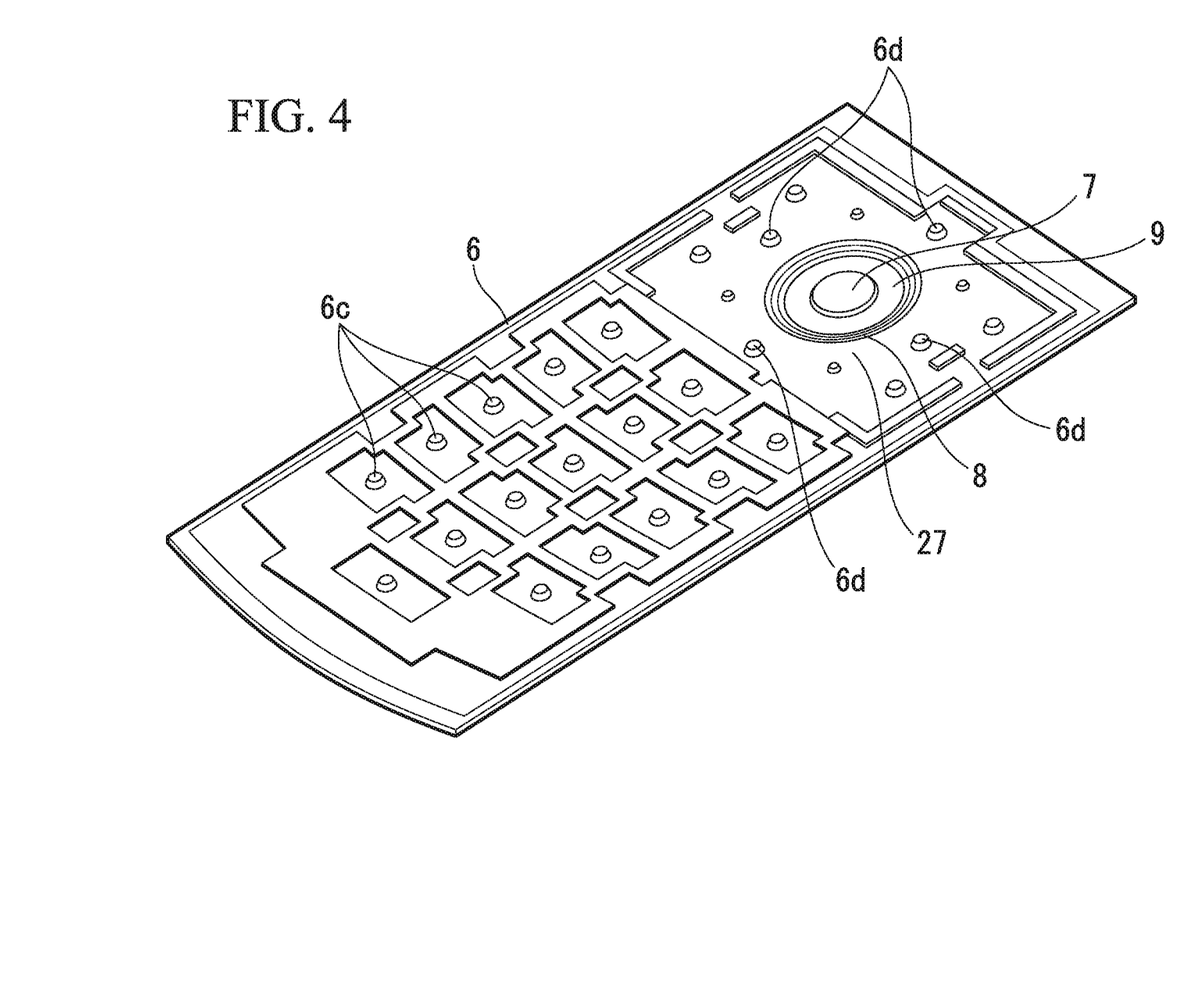
FIG. 4 is a perspective view showing the key rubber 6 in the embodiment of the present invention.

FIG. 4 is a perspective view showing the key rubber 6.

As shown in FIGS. 2 and 4, the key rubber 6 is a member having a sheet form made using a rubber (or rubber-like) elastic body, and has substantially the same size as the key unit 2.

As shown in FIGS. 3 and 4, the key rubber 6 has a detachment preventing plate attaching part 7, a ring-faun magnet fastening part 9, a bellows part 8, and a directional key attaching part 27.

The detachment preventing plate attaching part 7 has a circular plane whose size is almost identical to that of the detachment preventing plate 26. The detachment preventing plate attaching part 7 is formed in a center area of the key rubber 6, where the position of the part 7 is near one end of the length of the key rubber 6.

The ring-form magnet fastening part 9 is recessed from the detachment preventing plate attaching part 7 in the thickness direction of the key rubber 6, and has a substantially U-shaped section in the relevant thickness direction. That is, the ring-form magnet fastening part 9 has a ring form that surrounds the detachment preventing plate attaching part 7.

The bellows part 8 is a member having a bellows-like section in the thickness direction of the key rubber 6, and also has a ring form that surrounds the ring-form magnet fastening part 9. When receiving a load applied along the above plane of the detachment preventing plate attaching part 7, the bellows part 8 can be elastically deformed and thus can expand and contract.

The directional key attaching part 27 is provided so as to surround the bellows part 8. An outer-peripheral part 25b of the directional key 25 is adhered to the directional key attaching part 27 by using an adhesive.

Additionally, as shown in FIG. 4, the key rubber 6 has button pushers 6c at positions corresponding to those of the buttons 2c.

The key rubber 6 also has directional key pushers 6d at a position corresponding to an outer-peripheral edge area of the directional key 25. The directional key pushers 6d (maybe 4 pushers 6d) are provided at regular intervals along a circumferential direction. In the key rubber 6, the hardness of the rubber may be different between an area inside and of the bellows part 8 (i.e., the area which is elastically deformed by the operation of the decision key top 3) and the other peripheral area. In such a case, the hardness of the rubber is set to be different at least between the bellows part 8 and a part which supports the directional key 25. Accordingly, it is possible to appropriately adjust respective movement loads occurring when (i) operating the decision key top 3 and (ii) operating the other parts such as the directional key 25.

As shown in FIGS. 2 and 3, the ring-form magnetic member 5 is made using a ring-form permanent magnet, and fixedly contained in the ring-form magnet fastening part 9. The inner diameter of the ring-form magnetic member 5 is smaller than the diameter of the hole 25a of the directional key 25, and the outer diameter of the ring-form magnetic member 5 is larger than the diameter of the hole 25a. Additionally, the difference between the outer and inner diameters of the ring-form magnetic member 5 is larger than the slidable length of the decision key top 3.

Here, it is preferable to reduce the outer diameter of the ring-form magnetic member 5 as small as possible within a region which does not affect the differential magnetic flux measurement using Hall ICs 17 (explained later) of the ring-form magnetic member 5. Accordingly, the diameter of the bellows part 8 in the key rubber 6 can be reduced so that the region for adjusting the movement load of the directional key 25 can be extended.

As shown in FIGS. 2 and 3, the stopper plate 10 is a substantial disk-form member, and has a pusher part 11 at the center thereof, a spring part 12 that surrounds the pusher part 11, and an outer ring fixed part 12a having a ring form that surrounds the spring part 12.

The pusher part 11 has a substantial disk form. As shown in FIG. 3, the pusher part 11 has a pusher circular plane 11a which faces the metal dome sheet 14, and a key top pusher 11b which protrudes from the center of the pusher circular plane 11a toward the metal dome sheet 14.

The pusher part 11 also has a load receiving plane 11c which is formed on the opposite side of the pusher circular plane 11a and fixed to a back surface 7b of the detachment preventing plate attaching part 7 in the key rubber 6.

The spring part 12 is arranged so as to surround the pusher part 11 and connect the pusher part 11 with the outer ring fixed part 12a. When the decision key top 3 is pushed, the spring part 12 bends so as to generate a bending load which does not effect the operator's feeling for clicking, where even if the operation of sliding the decision key top 3 generates a load applied in a direction perpendicular to the relevant thickness direction of the spring part 12, the spring part 12 is not easily deformed.

The outer ring fixed part 12a having a ring form is connected to the spring part 12, and is fixed to the ring-form magnet fastening part 9 which faces the metal dome sheet 14.

As shown in FIGS. 2 and 3, the screen plate 4 is a substantial ring-form member, and has (i) an inner diameter that is larger than the outer diameter of the decision key top 3 and smaller than the outer diameter of the detachment preventing plate 26, and (ii) an outer diameter larger than the inner diameter of the hole 25a of the directional key 25. The screen plate 4 is adhered to a ring plane 5a formed at the ring-form magnetic member 5.

The above screen plate 4 covers a part of the inner peripheral portion of the ring-form magnetic member 5, which is exposed through the hole 25a of the directional key 25, so as to prevent the ring-form magnetic member 5 from being viewed through a gap between the decision key top 3 and the directional key 25.

Returning to FIG. 1, the metal dome sheet 14 has a substantially rectangular shape, and has metal domes 14a which function as switches and whose respective positions correspond to those of the corresponding buttons 2c (and pushers 6c) and decision key top 3 (and key top pusher 11b).

The metal dome sheet 14 also has eight sheet escape holes 15, which each have a rectangular section and are arranged circumferentially at regular intervals so as to surround the decision key top 3. The metal dome sheet 14 is adhered to the flexible substrate 16.

The flexible substrate 16 has a substantially rectangular shape, and multiple electronic parts are mounted thereon. In the present embodiment, the Hall ICs 17 for measuring a magnetic force applied by the ring-form magnetic member 5 are mounted on the flexible substrate 16 in a manner such that the ICs face the front case 24. Specifically, four Hall ICs 17 are arranged circumferentially at regular intervals so as to surround the decision key top 3.

In addition, the flexible substrate 16 also has eight substrate escape holes 18, which each have the same size and shape as the corresponding one of the above sheet escape holes 15. The substrate escape holes 18 are arranged circumferentially at regular intervals, that is, at positions corresponding to those of the sheet escape holes 15, so as to surround the four Hall ICs 17. The substrate escape holes 18 having the above-described structure is contained and fixedly attached to the front case 24.

The front case 24 is made by means of integral insert molding using the insert metal plate 19 and a resin.

The insert metal plate 19 is foamed by means of drawing of a metal plate, and has a key sheet attachment plane 23, a flexible substrate container 20 that is recessed from the key sheet attachment plane 23 so as to contain the flexible substrate 16, four escape holes 21 formed at the flexible substrate container 20, and eight protrusions 22 arranged circumferentially.

The flexible substrate container 20 should contain the flexible substrate 16 in a manner such that a step is present between the container 20 and the key sheet attachment plane 23. So long as this condition is satisfied, the material for forming the flexible substrate container 20 is not limited to a metal plate. In an example, the flexible substrate container 20 may be formed integrally with the key sheet attachment plane 23 by means of resin molding.

The four escape holes 21 are arranged circumferentially at positions corresponding to the four Hall ICs 17 mounted on the flexible substrate 16 which is contained in the flexible substrate container 20. As shown in FIG. 3, the escape holes 21 contain the respective four Hall ICs 17.

Figure 5:
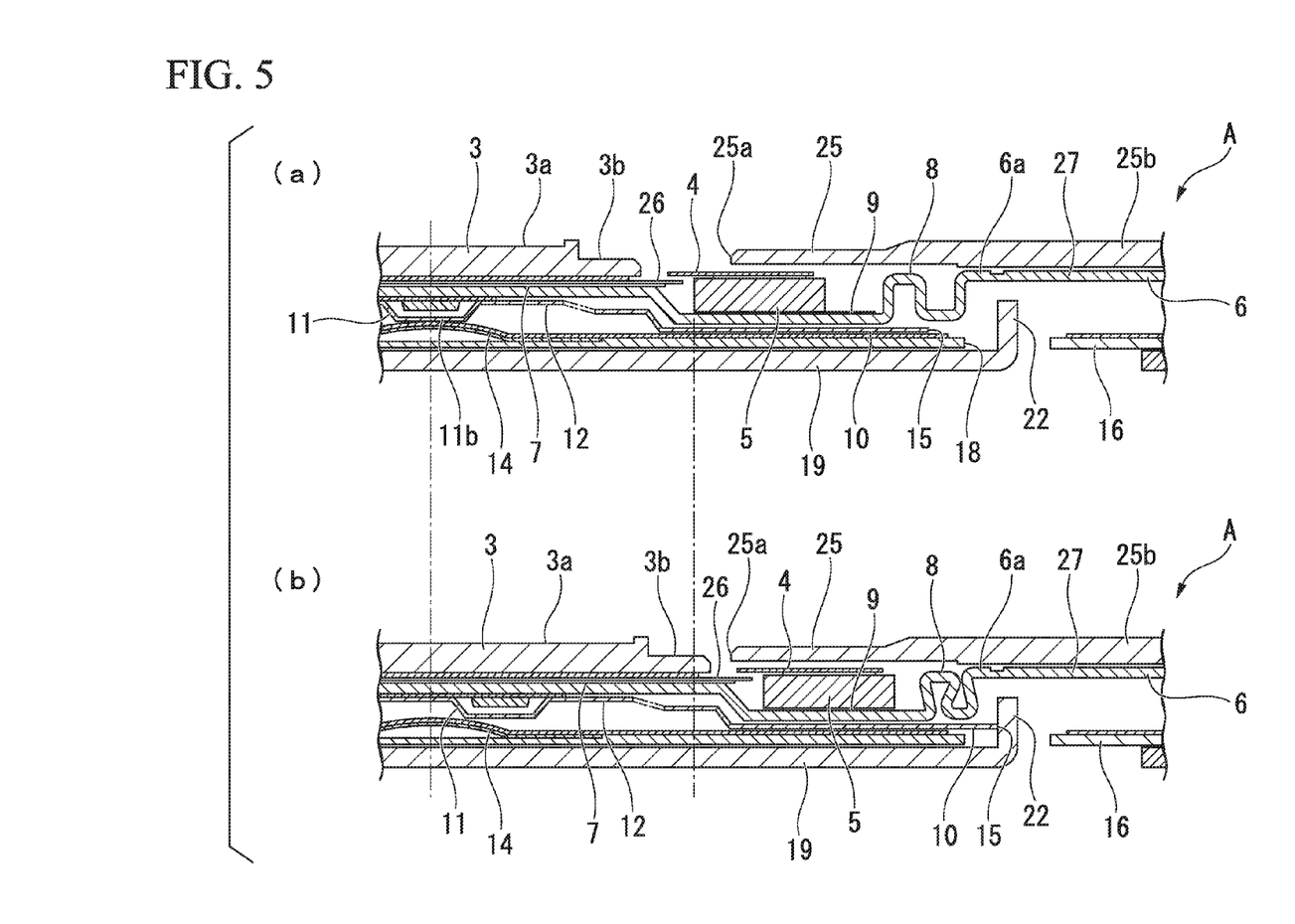
FIG. 5 shows sectional views of a part of the analog pointing key structure A, where this part differs from that shown in FIG. 3.

In the flexible substrate container 20, the protrusions 22 are arranged circumferentially so as to surround the four Hall ICs 17. The protrusions 22 protrude in a direction substantially perpendicular to the plane of the flexible substrate container 20. As shown in FIG. 5, the protrusions 22 pass through the corresponding sheet escape holes 15 and substrate escape holes 18.

The above-described directional key pushers 6d are arranged along a more outer periphery in comparison with the protrusions 22. That is, the outer diameter of the directional key 25 is larger than the diameter of a circle formed by the eight protrusions 22.

The flexible substrate 16 is attached to the flexible substrate container 20 according to the above structure.

Next, the operation of the analog pointing key structure A having the above structure will be explained using the drawings. FIG. 5 shows sectional views of a part of the analog pointing key structure A, where this part differs from that shown in FIG. 3.

As shown in FIG. 5, when the operator slides and moves the decision key top 3 in a direction (along a surface 6a of the key rubber 6) perpendicular to the thickness direction thereof by applying an appropriate force to the decision key top 3 (i.e., the state shown in part (a) of FIG. 5 is changed to the state shown in part (b)), part of the bellows part 8 in the sliding direction contracts while part of the bellows part 8 in the direction opposite thereto expands. In this process, the ring-form magnetic member 5 moves together with the decision key top 3 via the stopper plate 10, and thus is slid and moved by a displacement equal to that of the decision key top 3.

When the ring-form magnetic member 5 is slid and moved, the relatively positional relationship between the ring-form magnetic member 5 and the four Hall ICs 17 (see FIG. 3) changes. Accordingly, the amount of overlapping between the ring-form magnetic member 5 and each four Hall IC 17 which face each other, so that a differential magnetic flux can be measured and thus the position of the decision key top 3 can be measured. That is, the Hall ICs 17 supplies a magnetic flux density as a detection signal, obtained based on the position of the ring-form magnetic member 5, to the flexible substrate 16.

When further sliding and moving the decision key top 3 in the same direction as the above, the peripheral edge of the stopper plate 10 hits the protrusions 22, which restrict the movable range of the decision key top 3. Also during this process, the Hall ICs 17 continuously supply a detection signal according to the relevant displacement, to the flexible substrate 16. Additionally, even when sliding and moving the decision key top 3 up to the position where the peripheral edge of the stopper plate 10 hits the protrusions 22, the ring-form magnetic member 5, which is covered with the screen plate 4, is not viewed from the upside.

When the operator releases the load generated by the sliding movement, the deformation of the bellows part 8 is cancelled by an elastically returning force of the bellows part 8, and simultaneously the decision key top 3 returns to the original reference position.

On the other hand, when the operator pushes the decision key top 3 in the thickness direction thereof, the peripheral edge of the detachment preventing plate attaching part 7 and the spring part 12 are bent in the thickness direction, so that the key top pusher 11b is moved in the thickness direction. In this process, the pushing operation is preferably performed without affecting the operator's feeling for clicking.

When the relevant displacement of the key top pusher 11b is detected by the metal dome sheet 14, the metal dome sheet 14 supplies a pushing signal to the flexible substrate 16.

When the operator stops the pushing operation, the displacement of the decision key top 3 is immediately cancelled by an elastically returning force of the spring part 12 so that the decision key top 3 returns to the original reference position. While the displacement of the decision key top 3 in the thickness direction is cancelled, even if the operator again slides the decision key top 3 (by an operation similar to the above), the key top pusher 11b of the decision key top 3 does not interfere with the metal dome sheet in accordance with the sliding operation, because the displacement of the decision key top 3 in the thickness direction has been cancelled.

As described above, in accordance with the analog pointing key structure A (by the present invention) having the detachment preventing plate 26, even if the user operates the decision key top 3 with a large force, it is possible to prevent the decision key top 3 from being detached, thereby improving the durability of a product which employs the analog pointing key structure A.

In addition, since the detachment preventing plate 26 can cover a gap between the decision key top 3 and the screen plate 4, thereby improving the appearance of the relevant product.

Additionally, the outer diameter of the directional key 25 is larger than the diameter of the circle fowled by the eight protrusions 22, and in a known ordinary manner, the directional key pushers 6d of the key rubber 6 are formed at the positions corresponding to an outer-peripheral edge of the directional key 25. Furthermore, since the stopper plate 10 is movable inside the protrusions 22 of the insert metal plate 19, the metal domes 14a and the directional key pushers 6d cannot be arranged inside the protrusions 22, and they should be arranged outside of the protrusions 22 of the insert metal plate 19. In such a case, the outer diameter of the directional key 25 should be larger than that of an ordinary key of a sheet type, which may reduce the area of each of the other peripheral keys.

However, since the directional key 25 is made using a thin metal material having a high rigidity, it is possible to prevent the directional key 25 itself from being bent according to the key pushing operation. Therefore, key clicking of the directional key 25 can be achieved without arranging the directional key pushers 6d of the directional key 25 at positions corresponding to the outer-peripheral part 25b of the directional key 25. Since the bending of the directional key 25 can be prevented as described above, the flexibility for the position of the pushers of the directional key 25 can be improved, thereby implementing the downsizing of the directional key 25.

Also in accordance with the analog pointing key structure A having the stopper plate 10, when stopping the current pushing operation of the decision key top 3, the displacement of the decision key top 3 is quickly cancelled and the decision key top 3 immediately returns to the original reference position, so that the next pushing position or sliding operation can be immediately performed.

Additionally, since the pushing operation of the decision key top 3 can be defined, not only by the key rubber 6, but also by the stopper plate 10, the displacement due to the operation of pushing the decision key top 3 can be immediately cancelled.

Furthermore, the positional relationship in the sliding direction between the decision key top 3 and the ring-form magnetic member 5 is defined. Therefore, when sliding the decision key top 3, the ring-form magnetic member 5 is also slid by the same amount of displacement, thereby improving the responsibility of the ring-form magnetic member 5.

In addition, the movable region of the decision key top 3 in a direction along the surface 6a of the key rubber 6 is controlled in a manner such that the key rubber 6 contacts the protrusions 22, where the sliding operation of the decision key top 3 causes no load applied to the key rubber 6. Therefore, it is possible to determine a movable region corresponding to desired operability, and also to pretend the operability from being degraded according to degradation of the key rubber 6.

Additionally, in a structure employing the screen plate 4, even when the decision key top 3 is slid and moved in a direction along the surface of the key rubber 6, no ring-form magnetic member is exposed through a through-hole of the relevant key unit. Therefore, it is possible to prevent the operability from being degraded due to adhesion of dusts or the like to the ring-form magnetic member.

In addition, since the decision key top 3 and the ring-form magnetic member 5 do not overlap with each other in the thickness direction of the key rubber 6, it is possible to improve the flexibility of design, and implement a thinner structure.

Furthermore, in a structure in which the Hall ICs 17 are arranged on the flexible substrate 16 so that they do not overlap with each the decision key top 3 in the thickness direction, the Hall ICs 17 and the decision key top 3 do not overlap with each other in the thickness direction of the key rubber 6. Therefore, it is possible to improve the flexibility of design while keeping preferable operability, and a thinner structure can also be implemented.

In a structure in which the Hall ICs 17 are contained in the escape holes 21, the escape holes 21 for the magnetic sensor contain the corresponding Hall ICs 17, thereby implementing a further thinner structure.

Accordingly, it is possible to provide a thin analog pointing key structure A having preferable operability and sufficient functionability for practical use.

The operation procedure, the form or shape of each structural member, or the combinations between the structural members shown in the above-described embodiment are just examples, and various modifications can be made according to a desired design or the like, without departing from the scope of the present invention.

For example, although the decision key top 3 has a substantial disk form in the above embodiment, another form may be employed. In addition, the material of the decision key top 3 is not limited to hard resin, and the decision key top 3 may be made of metal or the like.

Although the above embodiment employs the Hall ICs 17 as a magnetic sensor, other elements such as Hall elements, magnetoresistance effect elements, or magnetoresistance effect ICs may be employed.

Although each structural element is fixed using an adhesive or double-coated adhesive tape, the fixing may be performed using spot welding between metal materials, or a screw together with a thread-cut metal material.

In addition, the protrusions 22 for restricting the movable range of the stopper plate 10 are formed using a metal plate inserted into the front case 24 in the embodiment. However, when employing a package that has no metal plate, protrusions which can function similarly to the protrusions 22 may be provided on the flexible substrate 16, instead of the protrusions which are lugs formed by processing a metal plate.

In addition to the above modifications, the structures shown in the above embodiment may each be optional, or be appropriately changed to another structure without departing from the scope of the present invention.

INDUSTRIAL APPLICABILITY

In accordance with the present invention, the key top support plate can prevent the first rigid body key top from falling through a hole of the screen plate, thereby preventing the first rigid body key top from being detached and improving the durability of a product which employs the analog pointing key structure of the present invention.

Additionally, since part of the operation of the rigid body key top can be defined, not only by the support member, but also by the elastic member. Therefore, it is possible to immediately cancel the displacement caused by pushing the rigid body key top, and to define a positional relationship between the rigid body key top and the ring-form magnetic member.

Accordingly, it is possible to provide an analog pointing key structure having preferable operability and sufficient functionability for practical use.

REFERENCE SYMBOLS 1 key sheet
2 key unit
2a circular hole (through-hole)
3 decision key top (first rigid body key top)
4 screen plate
5 ring-form magnetic member
6 key rubber (support member)
7 detachment preventing plate attaching part
8 bellows part (elastic returning part)
10 stopper plate (elastic member)
16 flexible substrate (substrate)
17 Hall IC (magnetic sensor)
22 protrusion
24 front case
25 directional key
25a hole
25b outer-peripheral part
26 detachment preventing plate
27 directional key attaching part
A analog pointing key structure

The invention claimed is:

1. An analog pointing key structure comprising:
a first rigid body key top;
a surrounding member that is provided so as to surround the first rigid body key top, and has a hole through which the first rigid body key top is exposed;
a support member, on a front surface of which the first rigid body key top is fixed, wherein the support member has an elastic returning part provided in at least a part of an area which surrounding the first rigid body key top, and the elastic returning part permits the first rigid body key top to move in a direction along a surface of the first rigid body key top, and can cancel the movement;
a ring-form magnetic member provided on a back-surface side of the surrounding member so as to be fixed to the support member and to surround the first rigid body key top, wherein at least a part of the ring-form magnetic member is interposed between the first rigid body key top and the elastic returning part;
a magnetic sensor that measures a change in a magnetic flux density due to a displacement of the ring-form magnetic member which moves together with the first rigid body key top;
a screen plate which has a ring form and is provided on a surface of the ring-form magnetic member, wherein an inner-peripheral part of the screen plate is positioned within the hole of the surrounding member;
a key top support plate, on a surface of which the first rigid body key top is attached, wherein an outer-peripheral part of the key top support plate is positioned on a back-surface side of the screen plate, and the key top support plate has an outer diameter larger than an inner diameter of the screen plate, and;
an elastic member fixed to a back surface of the support member, where the elastic member permits the first rigid body key top to move in a thickness direction of the support member, and can cancel the movement.

2. The analog pointing key structure in accordance with claim 1, wherein:
the key top support plate and the screen plate cover a gap between the first rigid body key top and the hole of the surrounding member.

3. The analog pointing key structure in accordance with claim 1, wherein:
the surrounding member functions as a second rigid body key top provided so as to surround the first rigid body key top; and
the support member permits the second rigid body key top to move in a direction along a surface of the second rigid body key top, and can cancel the movement.

4. The analog pointing key structure in accordance with claim 3, wherein:
the second rigid body key top is made of a metal.

5. The analog pointing key structure in accordance with claim 3, wherein:
the support member is made of a rubber material, and hardness of the rubber material is different at least between the elastic returning part and a part that supports the second rigid body key top.

6. The analog pointing key structure in accordance with claim 1, further comprising:
a protrusion that restricts a deformation caused when the first rigid body key top moves in the direction along the surface of the first rigid body key top; and
a substrate on which the magnetic sensor is mounted, wherein the protrusion is provided on the substrate.

* * * * *